United States Patent Office 3,493,411
Patented Feb. 3, 1970

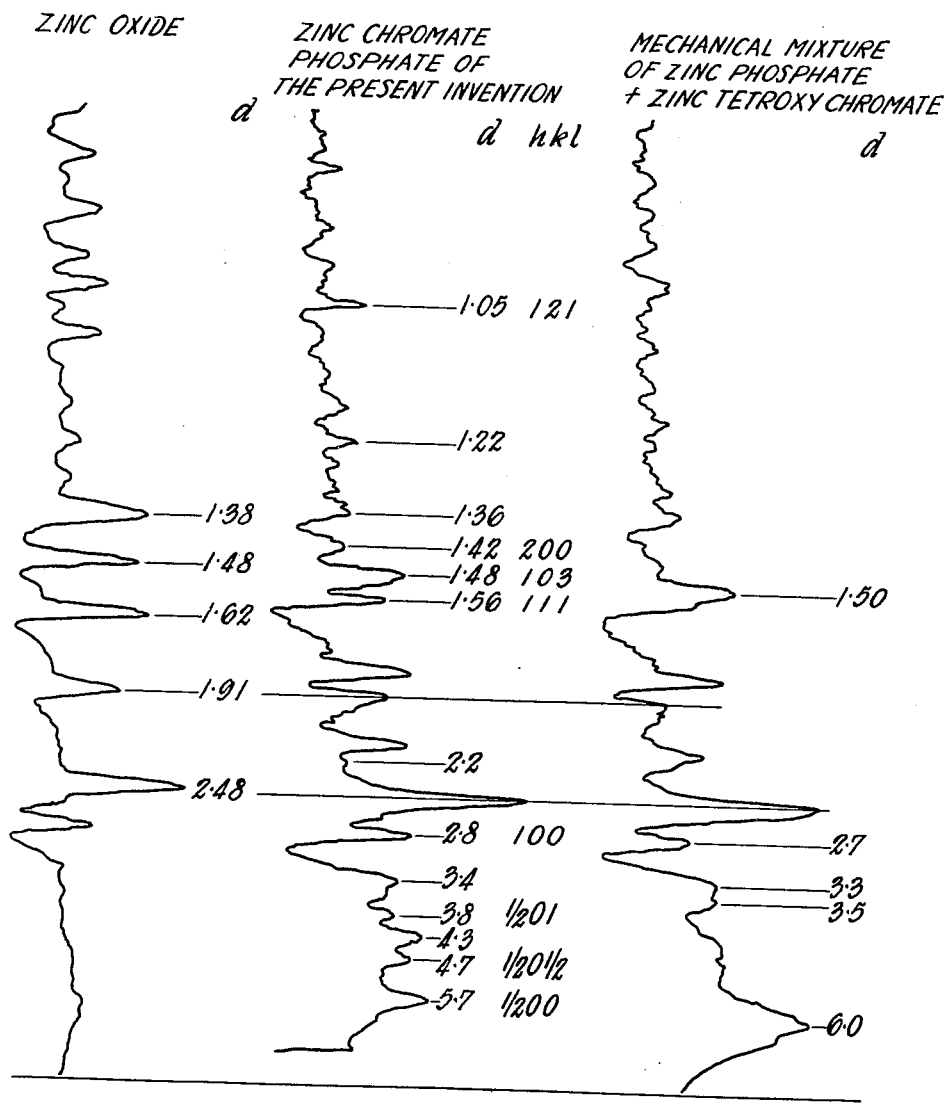

3,493,411
PIGMENT COMPOSITIONS
Herbert Frank Clay, Matlock, Derbyshire, England, assignor to Cromford Colour Company Limited, Matlock, Derbyshire, England, a British company
Filed June 8, 1967, Ser. No. 644,701
Claims priority, application Great Britain, July 12, 1966, 31,149/66
Int. Cl. C09c 1/04, 1/08
U.S. Cl. 106—292     6 Claims

ABSTRACT OF THE DISCLOSURE

A pigment composition formed by the coprecipitation of zinc phosphate and basic zinc chromate and suitable for use in the production of anti-corrosive primer compositions.

BACKGROUND OF THE INVENTION

Figure 1:
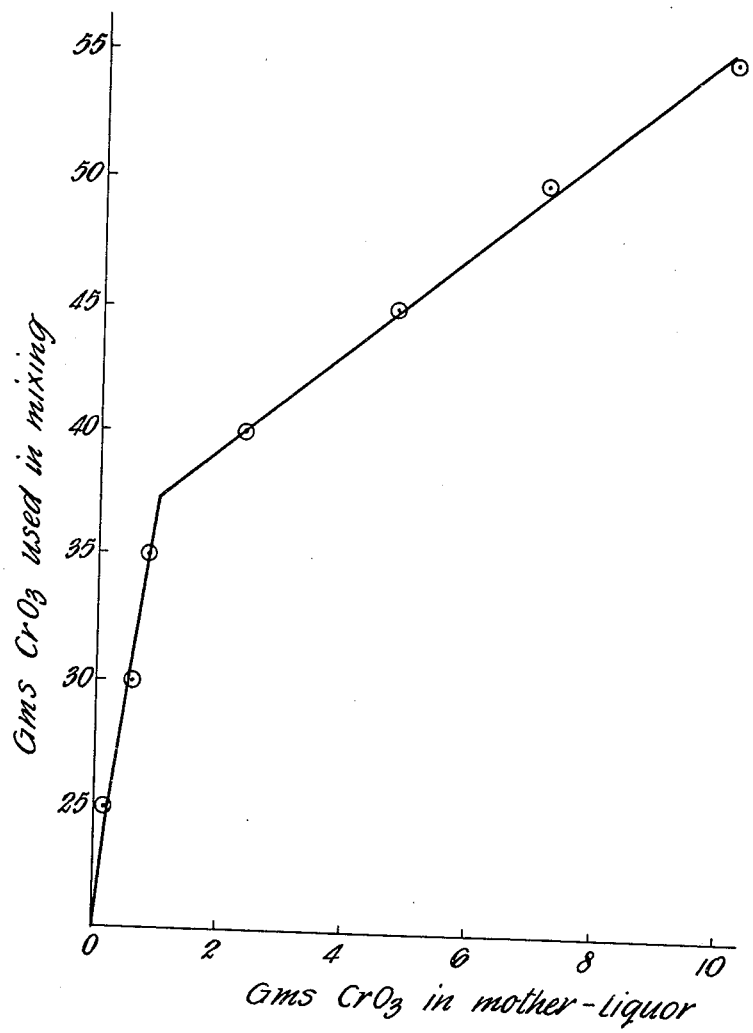

The invention relates to the production of a pigment composition suitable for use in paints, for example in anti-corrosive primer compositions for the protection of ferrous metal surfaces.

It is well known that chromate and phosphate ions inhibit the rusting of iron and steel and that the performance of anti-corrosive paints can be enhanced by the incorporation of chromate and phosphate pigments. Whilst basic zinc potassium chromate (commonly known as zinc chrome BS389, type 2 or merely as zinc chromate) and zinc tetroxychromate (also known as zinc chrome BS389, type 3) have been found very useful as inhibitive pigments, paints produced from them occasionally fail by premature blistering. Although the development of this blistering is not rapid, it is undersirable and detracts from the appearance of the painted surface. On the other hand, paints containing a high proportion of zinc phosphate but no chromate shown little tendency to form blisters in the early stages of exposure, but when breakdown does eventually take place it proceeds more rapidly than with a paint containing chromates.

SUMMARY OF THE INVENTION

For the successful use of zinc phosphate in combination with a chromate, it has been found that the chromate portion should desirably have a low solubility otherwise the resistance to blistering will be decreased or even lost altogether. By coprecipitating zinc orthophosphate and a basic zinc chromate, a pigment composition is obtained in which the chromate is of low solubility. Paint films formed from primer compositions comprising a paint vehicle and the pigment composition have good resistance to weathering.

According to the present invention there is provided a pigment composition comprising a coprecipitated mixture of zinc orthophosphate and a basic zinc chromate in which the weight of phosphate ion is chemically equivalent to from 45 to 70% of the total zinc present.

The composition can be prepared by reacting zinc oxide with phosphoric acid and chromic acid, the quantity of phosphoric acid used being from 45 to 70% by weight of the stoichiometric quantity required to convert all the zinc oxide to zinc orthophosphate and the quantity of chromic acid used being such as to convert the zinc oxide not required for reaction with phosphoric acid to a basic zinc chromate in which the molar ratio of $CrO_3$ to ZnO is from 1:3 to 1:5.

It is important that the amount of chromic acid employed when preparing the pigment composition in accordance with the present invention should not be sufficient to completely convert to zinc chromate, $ZnCrO_4$, that part of the zinc oxide not reacted with phosphoric acid since this would produce a pigment of excessive solubility which would be liable to give rise to osmotic blistering of a paint film containing the pigment if such film was required to withstand immersion in liquids or sustained weathering from unfavourable atmospheric conditions.

Although the pigment composition of the invention has been referred to as if it was a mixture, it is apparent from X-ray photographs that it can be more correctly regarded as a substituted zinc oxide.

By examining a range of pigment compositions of the present invention, the optimum performance was found to be provided by a pigment composition prepared from zinc oxide, phosphoric acid and chromic acid in proportions such that the composition can be represented by the empirical formula

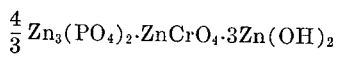

An explanation for the outstanding merit of this particular composition can be deduced by preparing a series of pigment compositions from zinc oxide, phosphoric acid and varying amounts of chromic acid and thereafter determining the amount of chromic acid remaining in the mother liquid after the pigment composition has been filtered therefrom. If the amount of chromic acid present in the mother liquor is plotted against the total amount of chromic acid used, a graph as illustrated in FIGURE 1 of the accompanying drawings is obtained. It can be seen that the graph exhibits a discontinuity at almost exactly the point corresponding to a pigment composition having the empirical formula

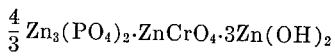

It would appear that this composition represents the limit point at which any advantage obtained by increasing the amount of chromate in the pigment composition is offset by the greater ease with which the chromate can be leached out.

Whilst any reactive zinc oxide may be used in producing the zinc chromate phosphates in accordance with the present invention, the grades sold commercially as Red Seal and White Seal are particularly suitable. Although some alkali metal chromates or dichromates must be used in the manufacture of zinc potassium chromate and may be used in the manufacture of zinc tetroxychromate, it is advisable to use chromic acid as the source of chromate when preparing the pigment compositions of the present invention.

Zinc oxide reacts readily with either chromic acid or phosphoric acid and both zinc phosphate and basic zinc chromates, such as zinc tetroxychromate, can be prepared at room temperature. However, it is desirable to use a higher temperature in order to obtain a pigment composition of the present invention with a particularly low solubility and to avoid excessive losses of chromate in the mother liquor, a temperature of 80° C. or over being preferred.

The pigment composition of the present invention can be formulated into primer compositions by admixture with a conventional paint vehicle. Vehicles suitable for use include various oleoresinous systems, for example alkyd and phenolic resin media. Generally, the pigment composition of the present invention will constitute from 15 to 40% by weight of the total pigment present in the primer composition. When it is desired to use the pigment composition with a paint vehicle, a test should always be made to see if thickening or gelation of the paint takes place. As a general guide, any paint vehicle which can be pigmented with zinc tetroxychromate can be pigmented with the compositions of the present invention.

As in the case of zinc tetroxychromate the pigment compositions of the present invention are not generally suitable for use with water soluble resins, however they may be used advantageously with emulsified resins such as selected vinyl emulsion systems.

When the pigment compositions of the present invention are used in primer compositions, the remainder of the pigment content of the primer will normally consist of conventional materials suitable for such purpose, for example, calcium carbonate, diatomaceous earth, talc or iron oxide.

If desired, the pigment compositions of the present invention may be used in epoxyamide, epoxypolyamide and epoxy ester coatings.

The following examples illustrate the invention.

EXAMPLE 1

Into a fourteen litre capacity stainless steel beaker, fitted with a mechanical stirrer, there were placed 244 grams of zinc oxide (White Seal quality) and two litres of water and the mixture was stirred for one hour. A further one litre of water was then added, while continuing stirring and the temperature was slowly raised to 80° C. Thereafter, over a period of thirty minutes, there was added 37 g. of chromic acid, dissolved in 200 ml. of water, and then 122 g. (74.2 ml.) of 80% orthophosphoric acid. The resulting mixture was stirred for a further hour at 80° C. and sufficient water was then added to fill the beaker, and the pigment composition allowed to settle. The zinc chromate phosphate was then filtered off and dried to give 380 grams of a product in the form of soft lumps which was suitable for use in paint production without further treatment. The pigment composition obtained in this example conformed empirically to the formula

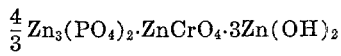

$$\tfrac{4}{3}Zn_3(PO_4)_2 \cdot ZnCrO_4 \cdot 3Zn(OH)_2$$

This pigment composition was examined by an X-ray crystallographic technique. For comparison purposes a composition formed by grinding 45 parts by weight of zinc phosphate with 55 parts by weight of zinc tetroxychromate was similarly examined. (Zinc tetroxychromate was used because there is no evidence that zinc trioxychromate exists as such. The product of reacting zinc oxide with chromic acid in the proportions required to give the composition of zinc trioxychromate has an X-ray pattern identical with that of zinc tetroxychromate.) FIGURE 2 of the accompanying drawings shows the automatically recorded derivative plots of Debye-Scherrer photographs for each composition. In addition, a plot for zinc oxide attenuated by a factor of 3 because of its sharper lines is included, the crystal lattice spacings in Angstrom units being obtained by interpolation and extrapolation of the data given for zinc oxide in the ASTM index of X-ray patterns.

On reference to FIGURE 2, it will be seen that some of the lines exhibited by zinc oxide, in particular those at 1.91 and 2.48, are common to both the other plots. However the strong zinc oxide line at 1.62 is absent from the pattern of the zinc chromate phosphate of the present invention, this indicating that little or no free oxide is present. Further, there are a number of lines which are more marked or only present at all on the zinc chromate phosphate plot and a number of lines which are more marked or only present at all on the plot of the mechanical mixture. Thus it will be seen that the zinc chromate phosphate of the present invention is quite a different material from that produced by simply mechanically admixing zinc phosphate and zinc tetroxychromate.

By using the known information that zinc oxide has a hexagonal structure with $a=3.254$ and $c=5.21$ Angstroms, it is possible to calculate values for all possible crystal indices. If simple fractional indices are included, most of the lines found on the zinc chromate phosphate plot but not on that of the mechanical admixture can be attributed to planes which would be present in a lattice made up of zinc oxide units. These calculated indices are shown in FIGURE 2.

EXAMPLE 2

The following ingredients were ground for 24 hours in a quart-size laboratory ball mill to produce a primer composition:

| | G. |
|---|---|
| Zinc chromate phosphate of Example 1 | 27 |
| Red iron oxide | 128 |
| Whiting | 6.2 |
| Surface treated calcium carbonate | 5.0 |
| Diatomaceous earth | 6.2 |
| Short oil hard reduced phenolic varnish (50% solids in white spirit) | 144 |
| High flash point naphtha | 50 |
| Cobalt naphthenate (6% cobalt) | 1.5 |
| Lead naphthenate (24% Pb) | 2.1 |

The zinc chromate phosphate used amounted to 15.3% by weight of the total weight of pigment and the pigment volume concentration of the primer composition was 35%. This primer composition when applied to mild steel panels and evaluated by sea-water immersion or by using a salt spray cabinet gave a better performance than a similar primer in which the zinc chromate phosphate was replaced by a similar weight of zinc chrome defined by either BS389, type 2 or type 3 and a much better performance than a similar primer in which the zinc chromate phosphate was replaced by a similar weight of zinc orthophosphate. It also gave a better performance than a primer composition containing, in place of the zinc chromate phosphate, a mixture comprising 7.65% by weight of zinc orthophosphate and 7.65% by weight of zinc chrome BS389, type 2, and an improved performance as compared with a mixture comprising 7.65% by weight of zinc orthophosphate and 7.65% by weight of zinc chrome BS389, type 3.

I claim:

1. A pigment composition comprising a coprecipitated mixture of zinc phosphate and a basic zinc chromate in which the weight of phosphate ion is chemically equivalent to from 45 to 70% of the total zinc present and in which the molar ratio of $CrO_3$ to $ZnO$ is from 1:3 to 1:6.

2. A pigment composition as claimed in claim 1 having the empirical formula

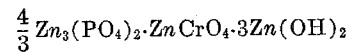

$$\tfrac{4}{3}Zn_3(PO_4)_2 \cdot ZnCrO_4 \cdot 3Zn(OH)_2$$

3. Process for preparing a pigment composition, which comprises reacting zinc oxide with phosphoric acid and chromic acid to coprecipitate a mixture of zinc phosphate and a basic zinc chromate, the quantity of phosphoric acid used being from 45 to 70% by weight of the stoichiometric quantity required to convert all the zinc oxide to zinc orthophosphate and the quantity of chromic acid used being such as to convert the zinc oxide not required for reaction with phosphoric acid to a basic zinc chromate in which the molar ratio of $CrO_2$ to ZnO is from 1:3 to 1:6.

4. Process according to claim 3, wherein the reaction is effected at a temperature of at least 80° C.

5. A primer composition comprising a pigment composition as claimed in claim 1 and a paint vehicle.

6. A primer composition comprising a pigment composition as claimed in claim 2 and a paint vehicle.

References Cited

UNITED STATES PATENTS

| | | |
|---|---|---|
| 2,251,866 | 8/1941 | Leisy _____ 106—292 |
| 2,340,716 | 2/1944 | Van Wirt et al. _____ 106—292 |
| 2,415,394 | 2/1947 | Tarr et al. _____ 106—302 |
| 2,419,017 | 4/1947 | Grimm _____ 106—292 |

JAMES E. POER, Primary Examiner

U.S. Cl. X.R.

106—302